United States Patent [19]

Ishida

[11] 4,456,047

[45] Jun. 26, 1984

[54] CONNECTING STRUCTURE OF TRACTION DEVICE FOR VEHICLE WHEELS

[75] Inventor: Kenichi Ishida, Ishikawa, Japan

[73] Assignee: Shigetoyo Yasui, Japan

[21] Appl. No.: 430,521

[22] Filed: Sep. 30, 1982

[30] Foreign Application Priority Data

May 11, 1982 [JP] Japan ............................. 57-68583[U]

[51] Int. Cl.³ ............................................. B60C 27/06
[52] U.S. Cl. ............................. 152/213 A; 24/68 TT;
24/69 TT; 81/15.8; 152/218; 152/219;
152/221; 152/242
[58] Field of Search ............... 152/213 R, 213 A, 216,
152/217-221, 239, 241, 242; 81/15.8; 254/251,
256; 24/68 TT, 69 T, 69 TT, 499, 500, 501, 129 D

[56] References Cited

U.S. PATENT DOCUMENTS

| | | | |
|---|---|---|---|
| 1,404,524 | 1/1922 | Hilliard | 152/241 X |
| 1,820,449 | 8/1931 | Dutton | 24/68 TT |
| 4,162,697 | 7/1979 | Zinner | 152/217 |

*Primary Examiner*—William A. Powell
*Assistant Examiner*—Thomas Bokan
*Attorney, Agent, or Firm*—Steele, Gould & Fried

[57] ABSTRACT

A traction device comprises a traction means such as, for example, a chain mounted on a wheel tire, and a connecting means to connect both end portions of the chain when mounted on. Said connecting means comprises a long extension having a first hook portion at one end, and a short extension having a second hook portion at one end corresponding to said first hook portion, the extension being pivoted to said long extension. Said first and second hook portions are respectively hooked to the end portions of the chain, and by rotating said long extension in a predetermined direction, both end portions of the chain are pulled to approach together so as to perform the connection.

2 Claims, 4 Drawing Figures

CONNECTING STRUCTURE OF TRACTION DEVICE FOR VEHICLE WHEELS

BACKGROUND OF THE INVENTION (1) Field of the Art

The present invention relates to an improved connecting structure of traction device which may be applied to the tire of the driven or power wheels of an automotive vehicle.

(2) Description of the Prior Art

In an automotive vehicle, a traction device is mounted on the tire of the driven wheels to cope with the ice-surfaced road by snow fall especially in winter season. Said traction device comprises net-shaped chain ring, and is placed around the tread of the tire. In this situation, both ends of the chain are manually pulled to approach together so as to connect them by a hook-shaped tool. However, it needs relatively strong effort to pull the weighty chain.

In addition, when the chain is mounted on the tire the slack is unavoidably set up in the chain. In order to take out the slack from the chain, a loop-shaped spring is concentrically disposed to the outer side of the wheel, and the chain is connected to the spring by a plurality of strips so that the chain is always resiliently pulled toward the center of the wheel.

In consequence, discrete components such as said spring and strip are needed, and mounting the chain is particularly hard and laborious, especially in the uncomfortable condition, in which such work is usually done.

Additionally in the above construction, the spring is always subjected to a big tensile stress due to a centrifugal force when the vehicle is running. There is a hazard that the spring is forcibly stretched to undergo permanent deformation.

Accordingly it is an object of the invention to provide a connecting structure of a traction device which readily connects both ends of a ring chain or the like when the chain is installed on a vehicle wheel and which equally readily disconnects the chain when no longer needed.

It is another object of the invention to provide a connecting structure of traction device which is relatively simple in construction and is longevity in life.

BRIEF DESCRIPTION OF THE DRAWINGS

The above and other objects, advantages and features of the present invention will be more fully understood when considered in connection with the following detailed description of a preferred embodiment thereof, taken in conjunction with the accompanying drawings wherein.

DETAILED DESCRIPTION OF THE INVENTION

Figure 1:
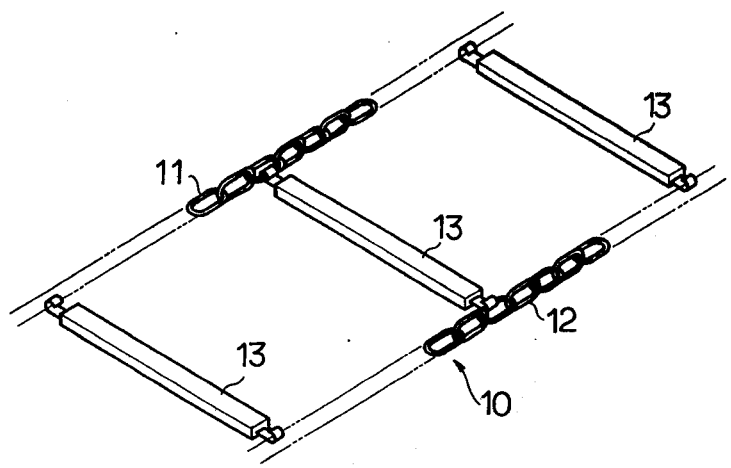
FIG. 1 is a perspective view of a traction means according to one embodiment of the invention.
Figure 2:
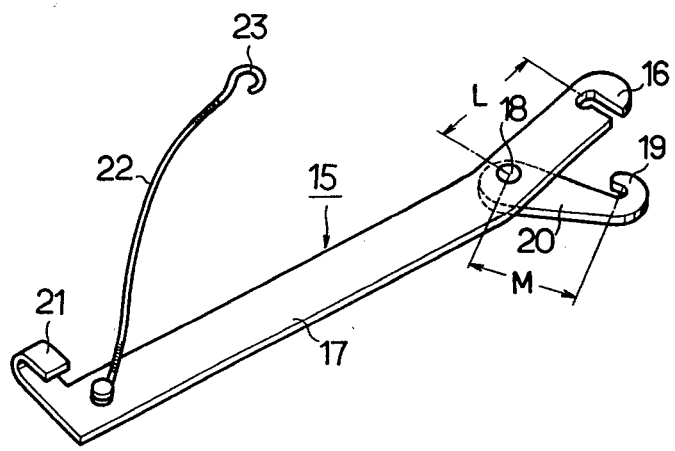
FIG. 2 is a perspective view of a connecting structure according to one embodiment of the invention.

Following is a description of the physical embodiment of the invention illustrated in FIGS. 1 to 4. Numeral 10 designates a traction means. The traction means 10 as seen in FIG. 1 comprises parallel spaced wires, e.g., chains 11, 12 and a plurality of traction bands 13 made of a flexible synthetic resin connected between said chains 11 and 12. The length of the chains 11, 12 are designed to be generally equal to the diameter of the shoulder portion of the tire 14 for a vehicle wheel, while the length of the band 13 is designed to be somewhat longer than the width of the tread of the tire 14. As best seen in FIG. 2, a connecting structure 15 which is made from, for example, a stamped metal comprises a long extension 17 having a first hook portion 16 at one end, and a short extension 20 having a second hook portion 19 at one end corresponding to said hook portion 16. Said short extension 20 is rotationally pivoted to said long extension 17 by means of a pin 18. In this situation, the distance (L) between the pin 18 and the hook portion 16 is determined somewhat longer than the distance (M) between the pin 18 and another hook portion 19. A U-shaped holder 21 integrally extends transversely from the end of the extension 17. In the meanwhile, a resilient strip 22 is attached at one end to the extension 17 in the neighborhood of the holder 21, while other end of said strip 22 has a semi-circular hook means 23 which will be hooked to the chain as described hereinafter.

Figure 3:
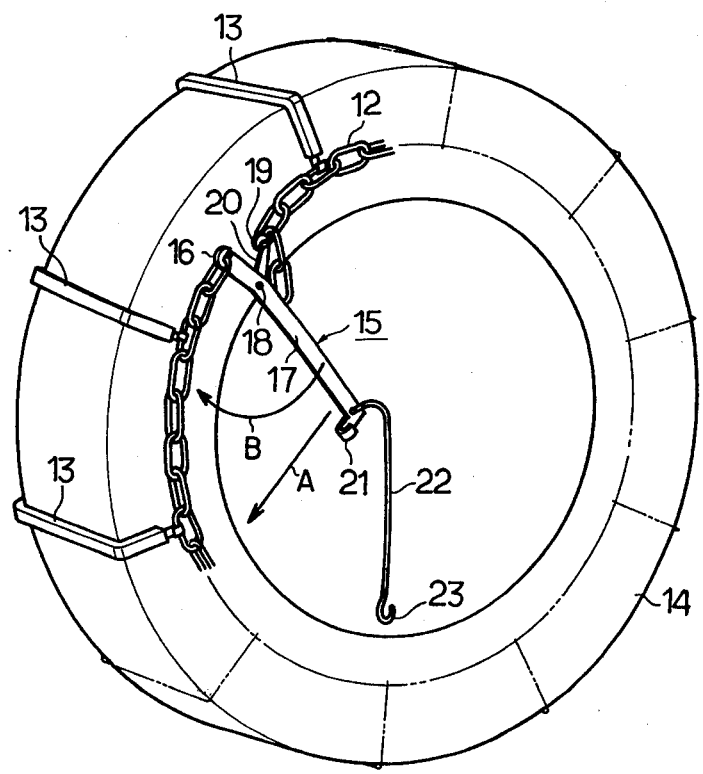
FIGS. 3 and 4 are perspective views to explain the operation when the traction means is installed on a vehicle wheel.
Figure 4:
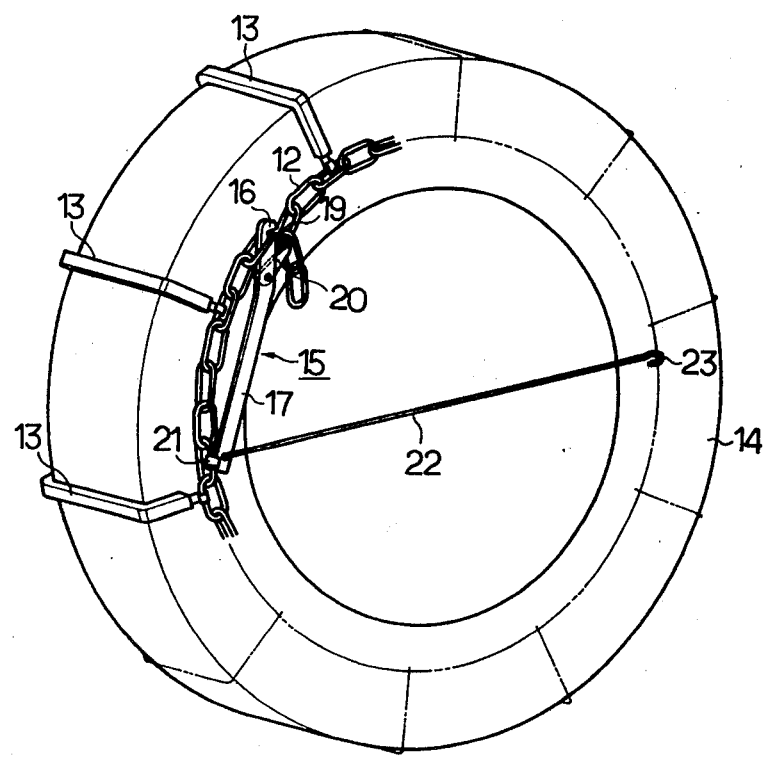

The above-described traction device operates as follows:

In applying the traction means 10 to the tire 14 of the vehicle wheel, the traction means 10 is placed around the tread portion of the tire 14. In the inner side of the vehicle wheel, both ends of the chain 11 is connected by means of a hook-shaped tool (not shown), while in the outer side of the wheel, the first and second hook portions 16, 19 are respectively hooked to the ends of the chain 12, and then the extension 17 is pulled in the direction of the arrow A as seen in FIG. 3 that is, toward the opposite direction of the short extension 20. As a consequence, the extension 17 pivots about the pin 18 in the direction of arrow B as seen in FIG. 3 to approach the short extension 20, so that both ends of the chain 12 encounter and substantially overlap by the length commensurate with the difference between the distances (L) and (M) as seen in FIG. 4. In this condition, the chains 11, 12 are stretched taut and simultaneously the traction band 13 is brought into tight engagement with the tread and the shoulder of the tire 14. Then the holder 21 is hooked to a suitable loop ring of the chain 12 to maintain above said condition. Additionally the hook means 23 of the resilient strip 22 is hooked to the loop ring of the chain 12 which is opposite registration with the holder 21 to ensure the connected condition more positive.

In removing the traction means 10 from the tire 14 of the vehicle wheel, the reversal procedure to mentioned above is followed.

With the structure above, both ends of the chain 12 are connected and disconnected merely by rotating the long extension 17 in predetermined directions when the traction means 10 is installed on the tire of the vehicle wheel and removed from the tire. Still more the long extension 17 is rotated with less effort even under the condition in which a large friction exerted between the synthetic resin band 13 and the tread of the tire 14 from the reason that the extension 17 is on the basis of leverage principal with the pin 18 as a fulcrum.

Additionally since the connecting structure 15 comprises links having suitable rigidity such as long and short extensions, the extensions are unlikely to be subjected to deformation, and thus allows longetivity.

It is noted that in the above embodiment of the invention, the distance (L) is determined somewhat longer than the distance (M), however, the dimensional relationship between the distances (L) and (M) may be varied depending on to what degree both ends of the chain may be approached.

Furthermore instead of the chains, a wire means may be employed as the traction means.

What is claimed is:

1. A connecting structure for a traction device for mounting around an automotive tire having traction means secured between spaced wire means, said connecting structure comprising a first extension member having a first hook means at one end adapted to engage the wire means on the outer side of the tire at one end portion, and a holder means at the other end, and a second extension member having a second hook means corresponding to said first hook means adapted to engage the other end portion of said wire means on the outer side of the tire, said second extension member being shorter than said first extension member and being pivotably rotatable on said first extension member, whereby upon fastening said connecting structure to a traction device, said second extension member is rotated in a direction so that both first and second hook means approach each other with said hook means being hooked to the ends of the wire means and overlap when holding the wire means in the rotated position, and an elongated resilient member mounted on the end of said connecting structure near said holder means, said resilient member having a hook means at its end for engaging the wire means on the outer side of the tire.

2. The connecting structure of claim 1 wherein said holder means of said first extension comprises a U-shaped hook integrally extending crosswisely from said first extension.

* * * * *